(12) United States Patent
Yamada et al.

(10) Patent No.: US 7,864,304 B2
(45) Date of Patent: Jan. 4, 2011

(54) BEAM IRRADIATION DEVICE, LASER RADAR SYSTEM, AND DETECTING DEVICE

(75) Inventors: Masato Yamada, Inuyama (JP); Atsushi Yamaguchi, Mizuho (JP); Yoshiaki Maeno, Mizuho (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 150 days.

(21) Appl. No.: 12/367,208

(22) Filed: Feb. 6, 2009

(65) Prior Publication Data

US 2009/0201488 A1    Aug. 13, 2009

(30) Foreign Application Priority Data

Feb. 7, 2008  (JP) .............................. 2008-027550
Dec. 4, 2008  (JP) .............................. 2008-310319

(51) Int. Cl.
*G01C 3/08* (2006.01)
(52) U.S. Cl. .................... 356/5.15; 356/4.01; 356/5.01
(58) Field of Classification Search ............... 356/4.01, 356/5.01, 5.15, 28; 250/201.2, 234; 359/850
See application file for complete search history.

(56) References Cited

U.S. PATENT DOCUMENTS

| | | | |
|---|---|---|---|
| 5,579,103 A * | 11/1996 | Tachikawa | 356/5.1 |
| 6,552,990 B1 * | 4/2003 | Kajiyama et al. | 369/112.06 |
| 7,262,765 B2 * | 8/2007 | Brown et al. | 345/207 |
| 7,351,944 B2 * | 4/2008 | Yamada et al. | 250/205 |
| 7,423,735 B2 * | 9/2008 | Suzuki et al. | 356/4.01 |

FOREIGN PATENT DOCUMENTS

JP    2006-153820 A    6/2006

\* cited by examiner

*Primary Examiner*—Isam Alsomiri
(74) *Attorney, Agent, or Firm*—Ditthavong Mori & Steiner, P.C.

(57) ABSTRACT

A beam irradiation device includes: a first light source for emitting laser light; an actuator for moving a scanning section for receiving the laser light to scan a target area with the laser light; a second light source movable with the scanning section and adapted for emitting diffused light; a light receiving position detection device for receiving the diffused light to output a signal depending on a position of receiving the diffused light; and a light projecting element, disposed at a position closer to the light receiving position detecting device with respect to an intermediate position between the second light source and the light receiving position detecting device, for projecting an emission position to be defined by the second light source on the light receiving position detecting device via a predetermined projection area.

11 Claims, 12 Drawing Sheets

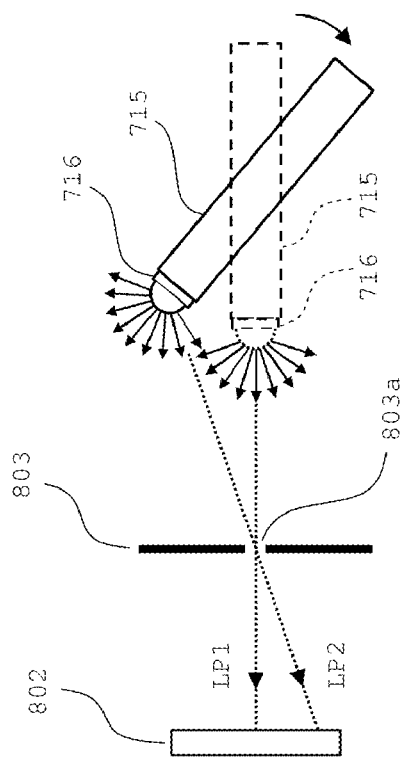
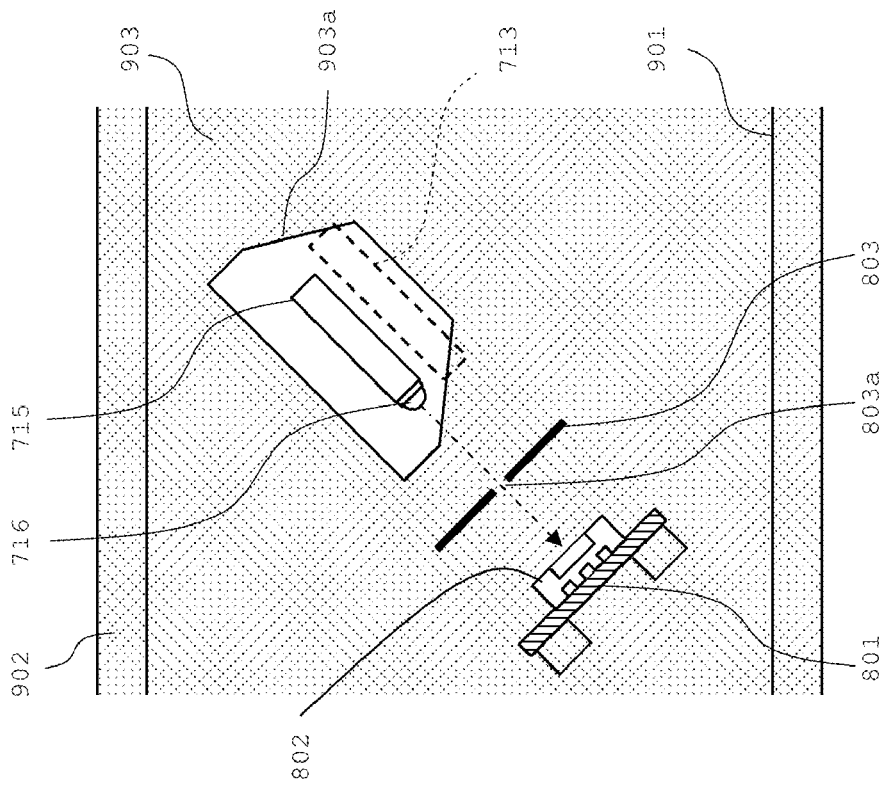
FIG. 12B
FIG. 12A

BEAM IRRADIATION DEVICE, LASER RADAR SYSTEM, AND DETECTING DEVICE

This application claims priority under 35 U.S.C. Section 119 of Japanese Patent Application No. 2008-27550 filed Feb. 7, 2008, entitled "BEAM IRRADIATION DEVICE, AND LASER RADAR SYSTEM" and Japanese Patent Application No. 2008-310319 filed Dec. 4, 2008, entitled "BEAM IRRADIATION DEVICE, AND LASER RADAR SYSTEM".

BACKGROUND OF THE INVENTION

1. Field of the Invention

The present invention relates to a laser radar system for irradiating laser light to detect a state of a target area, a beam irradiation device suitably used in the laser radar system, and a detecting device for detecting a position of a movable object.

2. Description of the Related Art

In recent years, a laser radar system has been loaded in a family automobile or a like vehicle to enhance security in driving. Generally, the laser radar system is configured in such a manner that a target area is scanned with laser light to detect whether there is an obstacle at each of scanning positions, based on presence or absence of reflection light at each of the scanning positions; and that a distance to the obstacle at the scanning position is measured based on a time period from the point of time when the laser light is irradiated to each of the scanning positions to the point of time when the reflection light at the scanning position is received.

It is necessary to properly scan a target area with laser light to increase detection precision of a laser radar system. It is also necessary to properly detect each of scanning positions by laser light.

A scanning position can be detected by e.g. separating a part of laser light to be irradiated onto a target area by a beam splitter or a like device, and receiving the separated light (servo light) by a photodetector (a light receiving position detecting device) such as a PSD (Position Sensitive Detector) for use in position detection.

In the above arrangement, the laser radar system has a lens actuator for moving a scanning lens for receiving laser light in a direction orthogonal to an optical axis of laser light. Driving the lens actuator allows for scanning a target area with laser light.

With use of the lens actuator, the scanning position can also be detected by directly detecting a moved position of the scanning lens. In order to perform the above operation, for instance, there is proposed an arrangement, wherein a laser light source for emitting servo light is mounted on a lens holder for supporting a scanning lens to receive servo light from the laser light source by a light receiving position detecting device (PSD).

In the above arrangement, increasing the moving amount of the scanning lens to increase the amplitude of laser light in a target area may increase the amplitude of servo light. This may require a light receiving position detecting device having a relatively large light receiving surface, and increase the cost of the laser radar system. Also, in the case where servo light is condensed on the light receiving position detecting device, a large-sized condenser lens is necessary to condense servo light having a certain magnitude of amplitude on the light receiving position detecting device. This may increase the cost of a laser radar system and the size of an optical system.

SUMMARY OF THE INVENTION

In view of the above, an object of the invention is to provide a beam irradiation device, a laser radar system, and a detecting device that enable to sufficiently suppress the amplitude of servo light on a light receiving position detecting device.

A beam irradiation device according to a first aspect of the present invention includes: a first light source for emitting laser light; an actuator for moving a scanning section for receiving the laser light to scan a target area with the laser light; a second light source movable with the scanning section and adapted for emitting diffused light; a light receiving position detecting device for receiving the diffused light to output a signal depending on a position of receiving the diffused light; and a light projecting element, disposed at a position closer to the light receiving position detecting device with respect to an intermediate position between the second light source and the light receiving position detecting device, for projecting an emission position to be defined by the second light source on the light receiving position detecting device via a predetermined projection area.

The beam irradiation device according to the first aspect enables to reduce the amplitude of light to be incident onto the light receiving position detecting device, as compared with the amplitude of light to be emitted from the second light source. Thereby, the light receiving position detecting device can be miniaturized, and the cost of the beam irradiation device can be reduced.

A laser radar system according to a second aspect of the invention includes: a beam irradiation device for irradiating laser light onto a target area; a photodetector for receiving light reflected from the target area; and a circuit section for detecting a state of the target area based on an output signal from the photodetector. The beam irradiation device includes: a first laser light for emitting laser light; an actuator for moving a scanning section for receiving the laser light to scan the target area with the laser light; a second light source movable with the scanning section and adapted for emitting diffused light; a light receiving position detecting device for receiving the diffused light to output a signal depending on a position of receiving the diffused light; and a light projecting element, disposed at a position closer to the light receiving position detecting device with respect to an intermediate position between the second light source and the light receiving position detecting device, for projecting an emission position to be defined by the second light source on the light receiving position detecting device via a predetermined projection area.

Similarly to the beam irradiation device according to the first aspect, the laser radar system according to the second aspect enables to reduce the amplitude of light to be incident onto the light receiving position detecting device. Thereby, the light receiving position detecting device can be miniaturized, and the cost of the laser radar system can be reduced.

A third aspect of the invention is directed to a detecting device for detecting a position of a movable object. The detecting device according to the third aspect includes a light source movable with the movable object, and adapted for emitting diffused light; a light receiving position detecting device for receiving the diffused light to output a signal depending on a position of receiving the diffused light; and a light projecting element, disposed at a position closer to the light receiving position detecting device with respect to an intermediate position between the light source and the light receiving position detecting device, for projecting an emission position to be defined by the light source on the light receiving position detecting device via a predetermined projection area.

Similarly to the beam irradiation device according to the first aspect, the detecting device according to the third aspect enables to reduce the amplitude of light to be incident onto the light receiving position detecting device. Thereby, the light receiving position detecting device can be miniaturized, and the cost of the detecting device can be reduced.

BRIEF DESCRIPTION OF THE DRAWINGS

These and other objects, and novel features of the present invention will become more apparent upon reading the following detailed description of the embodiment along with the accompanying drawings.

FIGS. 12A and 12B are diagrams for describing an optical system for detecting servo light, and a servo light detecting method in the modification (fourth modification) of the embodiment.

Figure 1B:
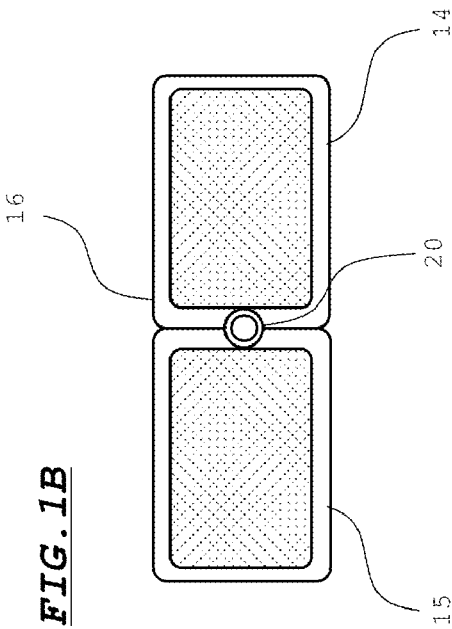
FIGS. 1A and 1B are diagrams showing an arrangement of a lens actuator embodying the invention.

The drawings are provided mainly for describing the present invention, and do not limit the scope of the present invention.

DESCRIPTION OF THE PREFERRED EMBODIMENTS

In the following, an embodiment of the invention is described referring to the drawings.

Figure 1A:
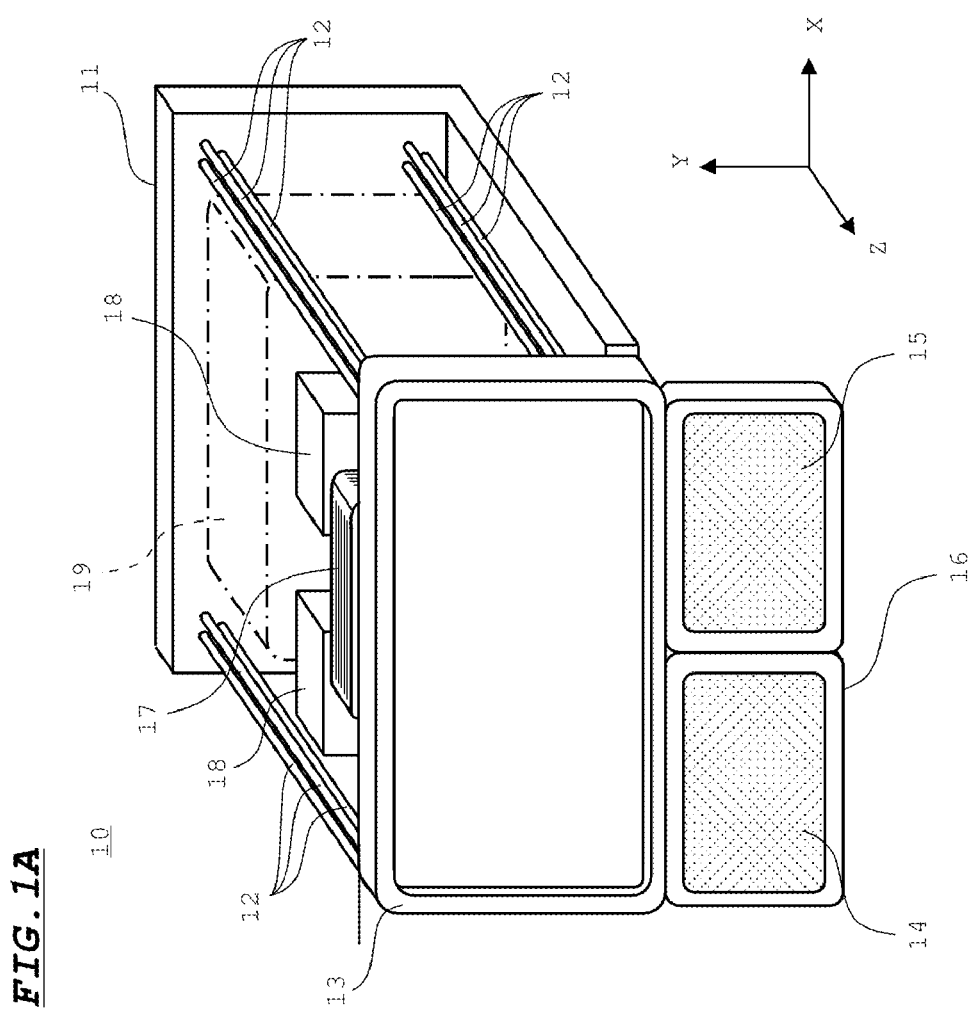

FIGS. 1A and 1B are diagrams showing an arrangement of a lens actuator. FIG. 1A is a perspective view of the lens actuator 10 viewed obliquely downwardly in a leftward direction. FIG. 1B is a rear view of a lens portion including a scanning lens 14.

Referring to FIG. 1A, a movable plate 13 is supported on a base member 11 via conductive suspension wires 12 to be movable in X-Y directions. Three each of the suspension wires 12 constitute a wire bundle, and the wire bundle is arranged at four positions of the lens actuator 10. In other words, twelve suspension wires 12 are used in this embodiment.

A single suspension wire 12 may be used at each position. However, in the case where a single suspension wire 12 is used at each position, it is necessary to increase the diameter of the suspension wire in order to obtain substantially the same spring coefficient as in the case where wire bundles each constituted of three suspension wires 12 are used. Use of a suspension wire 12 with an increased wire diameter may increase a load to be exerted on an end portion (a base portion) of the suspension wire 12 on the side of the base member 11 in moving the movable plate 13. As a result, the suspension wire 12 or the base member 11 may be damaged or broken. In view of this, in this embodiment, the diameter of each of the suspension wires 12 is reduced to suppress a force to be exerted on the base portion of the suspension wire 12, and a wire bundle is constituted of three suspension wires 12 in order to secure an intended spring coefficient even with use of the suspension wires 12 having the reduced wire diameter.

The scanning lens 14 constituted of a Fresnel lens, and a light receiving lens 15 are mounted on a bottom surface of the movable plate 13. A lens frame 16 is formed around the scanning lens 14 and the light receiving lens 15. An upper end of the lens frame 16 is attached to the movable plate 13. The scanning lens 14, the light receiving lens 15, and the lens frame 16 are molded into a unit, using a resin material.

A coil unit 17 is mounted on a rear surface of the movable plate 13. The coil unit 17 has a coil for driving the movable plate 13 in X-axis direction, and a coil for driving the movable plate 13 in Y-axis direction. A magnet unit 18 is mounted in the base member 11 to apply a magnetic field to the coil unit 17. In this embodiment, the coils constituting the coil unit 17 and magnets constituting the magnet unit 18 are constructed in such a manner that in response to application of a current to the corresponding coil, an electromagnetic driving force for driving the coil in X-axis direction or Y-axis direction is generated. By the electromagnetic driving force, the scanning lens 14 and the light receiving lens 15 are driven in X-axis direction and Y-axis direction along with the movable plate 13. A circuit unit 19 is also mounted in the base member 11.

In this embodiment, two suspension wires 12 are used as a wiring for current inflow and a wiring for current outflow, respectively in energizing the coils (the coil for driving in X-axis direction, and the coil for driving in Y-axis direction) of the coil unit 17.

Referring to FIG. 1B, an LED 20 is mounted at a position between the scanning lens 14 and the light receiving lens 15, on a rear surface of the lens frame 16. The LED 20 is of a diffusive type (a wide-angle type) and is capable of diffusing light at a wide angle. Diffused light from the LED 20 is utilized as servo light for detecting a scanning position in a target area, using laser light for scanning, which will be described later.

In this embodiment, two suspension wires 12, which are not used for supplying an electric power to the coil unit 17, are provided as wirings for applying a positive voltage and a negative voltage to an anode and a cathode of the LED 20, respectively.

With use of the lens actuator 10, the movable plate 13 (i.e. the scanning lens 14 and the LED 20) are frequently and rapidly moved, as laser light is emitted for scanning a target area. In the case where an electric power is supplied to the LED 20 via a lead wire or a like element in this state, a load may be continuously applied to the lead wire or the like element, which may damage or short-circuit the lead wire or the like element. On the other hand, in this embodiment, since an electric power is supplied using the suspension wires 12, there is no likelihood that the suspension wires 12 may be damaged even if the movable plate 13 is frequently and rapidly moved. This arrangement enables to stably supply an electric power to the LED 20.

Figure 2:
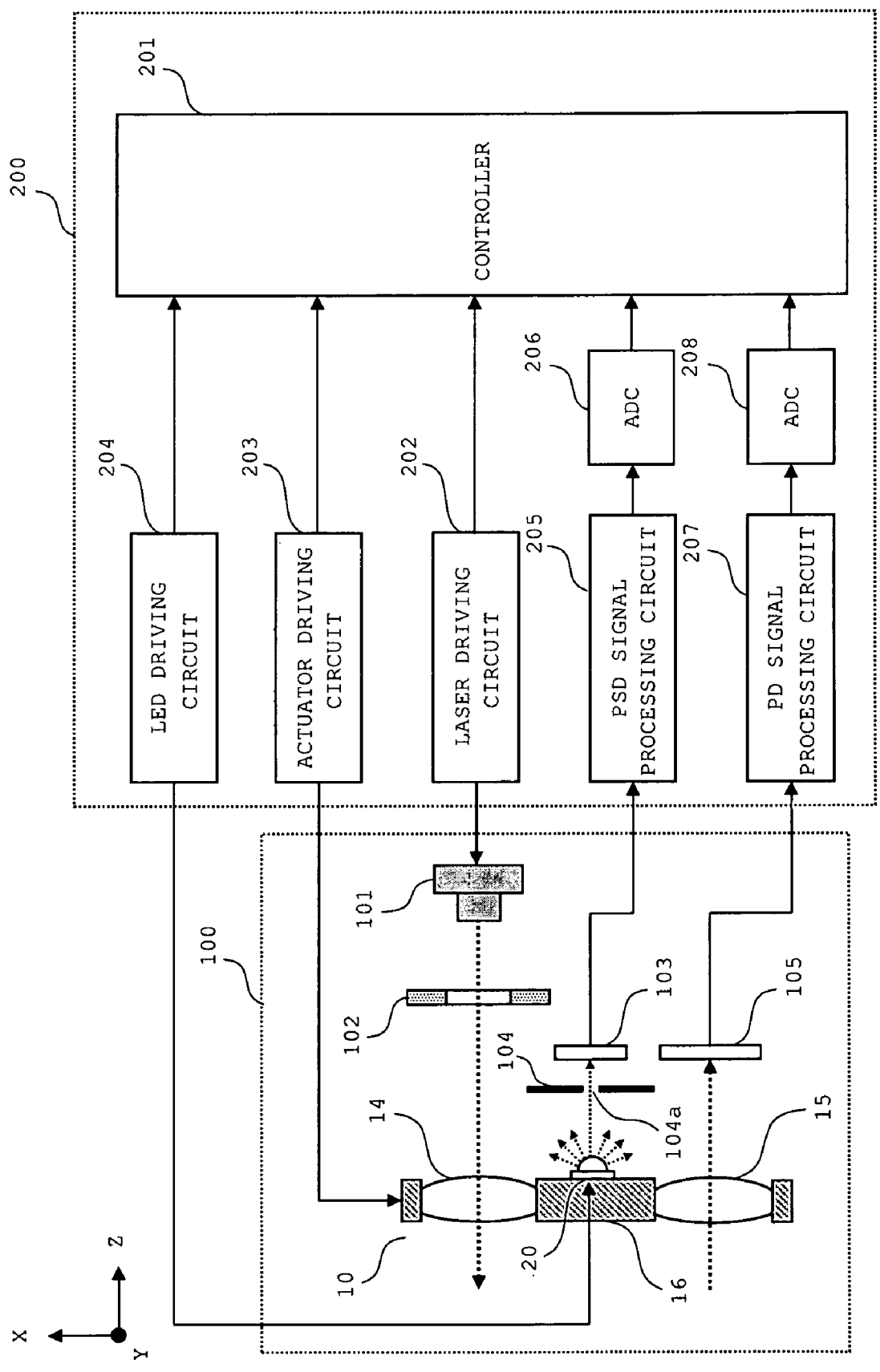
FIG. 2 is a diagram showing an arrangement of a laser radar system embodying the invention.

FIG. 2 is a diagram showing an arrangement of a laser radar system embodying the invention. As shown in FIG. 2, the laser radar system includes a beam irradiation head 100 and a driving unit 200.

The beam irradiation head 100 is operable to move a laser beam (laser light) to scan a target area in a space defined in front of the beam irradiation head 100. As shown in FIG. 2, the beam irradiation head 100 includes a semiconductor laser 101, an aperture plate 102, a PSD 103, a pinhole plate 104, and a photodetector 105, in addition to the lens actuator 10.

Laser light emitted from the semiconductor laser 101 has its shape formed into an intended shape through an aperture in the aperture plate 102. Thereafter, the laser light is incident onto the scanning lens 14 of the lens actuator 10. The scanning lens 14 is constituted of a biaspherical convex lens, and is operable to converge laser light incident from the semiconductor laser 101. With the above arrangement, laser light is converted into slightly divergent light, as compared with parallel light. The scanning lens 14 is supported on the lens actuator 10 to be movable in X-Y plane directions. Laser light transmitted through the scanning lens 14 has its propagating direction aligned in X-Y plane directions in accordance with driving of the lens actuator 10. The laser light transmitted through the scanning lens 14 is irradiated onto the target area.

A part of servo light diffusively emitted from the LED 20 is transmitted through a hole 104a in the pinhole plate 104, and received on the PSD 103. The servo light incident in a region other than the hole 104a is blocked by the pinhole plate 104. The PSD 103 is operable to output a current signal depending on a receiving position of servo light.

Figure 3B:
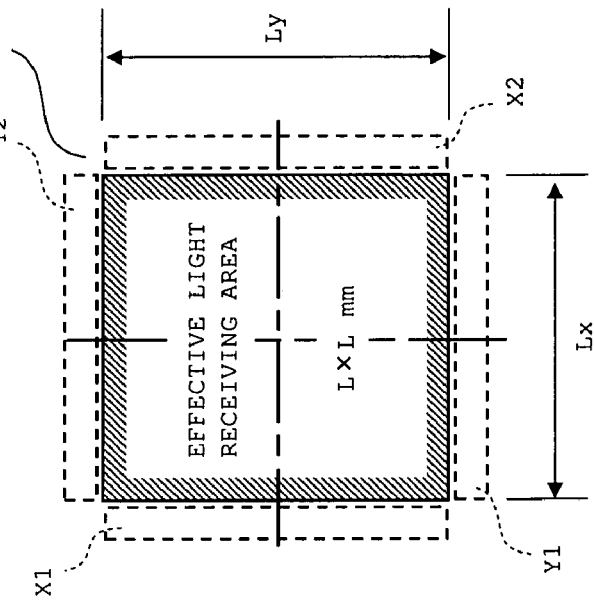
FIGS. 3A and 3B are diagrams showing an arrangement of a PSD embodying the invention.
Figure 3A:
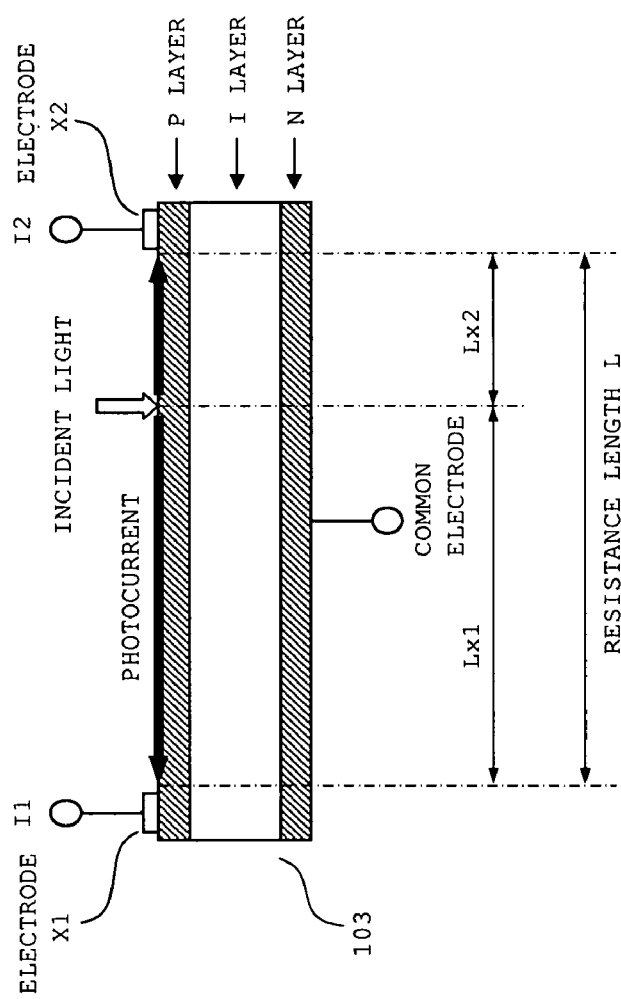

FIG. 3A is a diagram (a sectional side view) showing an arrangement of the PSD 103, and FIG. 3B is a diagram showing a light receiving surface of the PSD 103.

Referring to FIG. 3A, the PSD 103 is constructed by forming a P-type resistive layer serving as a light receiving surface and a resistive layer on a surface of an N-type high-resistive silicon substrate. Electrodes X1 and X2 for outputting a photocurrent in a horizontal direction in FIG. 3B, and electrodes Y1 and Y2 (not shown in FIG. 3A) for outputting a photocurrent in a vertical direction in FIG. 3B are formed on a surface of the resistive layer. A common electrode is formed on a rear surface of the PSD 103.

Upon irradiation of laser light onto the light receiving surface, an electric charge of a magnitude proportional to a received light amount is generated at the irradiated position. The electric charge is transmitted to the resistive layer as a photocurrent, and outputted from the electrodes X1, X2, Y1, and Y2, as a divided current of a magnitude inversely proportional to a distance to the respective corresponding electrodes. In this embodiment, an electric current to be outputted from the electrode X1, X2, Y1, Y2 has a magnitude inversely proportional to a distance from an irradiated position of laser light to the respective corresponding electrodes. Accordingly, it is possible to detect an irradiated position of light on the light receiving surface of the PSD 103, based on current values to be outputted from the electrodes X1, X2, Y1, and Y2.

Figure 4A:
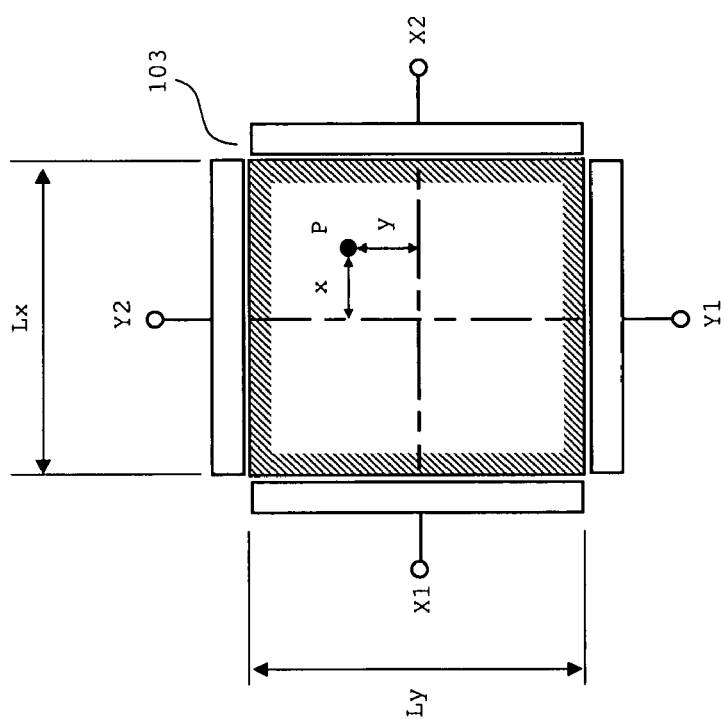
FIGS. 4A and 4B are diagrams for describing a position detection signal generating method embodying the invention.

For instance, let it be assumed that servo light is irradiated at a position P in FIG. 4A. In this case, a coordinate (x,y) of the position P with respect to a center on the light receiving surface as a reference point is calculated by e.g. the following equations (1) and (2):

$$\frac{Ix2 - Ix1}{Ix2 + Ix1} = \frac{2x}{Lx} \quad (1)$$

$$\frac{Iy2 - Iy1}{Iy2 + Iy1} = \frac{2y}{Ly} \quad (2)$$

where Ix1, Ix2, Iy1, and Iy2 are amounts of current to be outputted from the electrodes X1, X2, Y1, and Y2, respectively; and Lx and Ly are distances between the electrodes in X direction and Y direction, respectively.

Figure 4B:
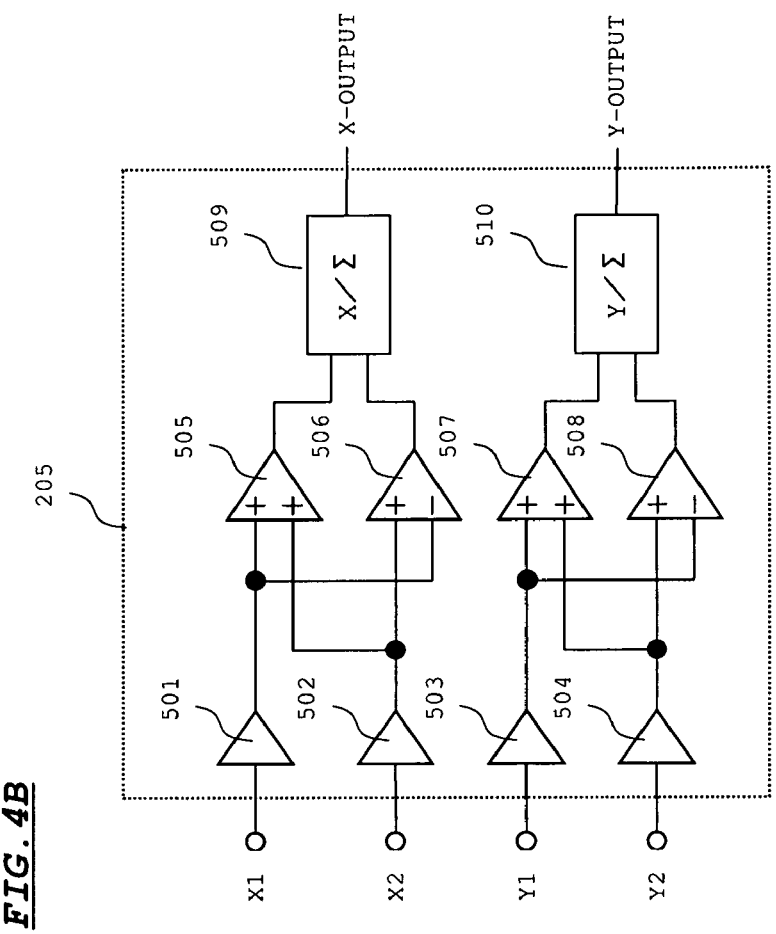

FIG. 4B is a diagram showing an arrangement of a computation circuit for realizing the above equations (1) and (2). The computation circuit is provided in a PSD signal processing circuit 205 to be described later. Current signals Ix1, Ix2, Iy1, and Iy2 to be outputted from the electrodes X1, X2, Y1, and Y2 are amplified by amplifiers 501, 502, 503, and 504, respectively. Then, adding circuits 505 and 507 perform computations (Ix2+Ix1) and (Iy2+Iy1), respectively. Then, subtracting circuits 506 and 508 perform computations (Ix2−Ix1) and (Iy2−Iy1), respectively. Then, dividing circuits 509 and 510 perform divisions represented by the left sides in the equations (1) and (2), respectively. Then, the dividing circuits 509 and 510 output position detection signals indicating an x-direction position (2x/Lx), and a y-direction position (2y/Ly) at the receiving position P of servo light, respectively.

Figure 5:
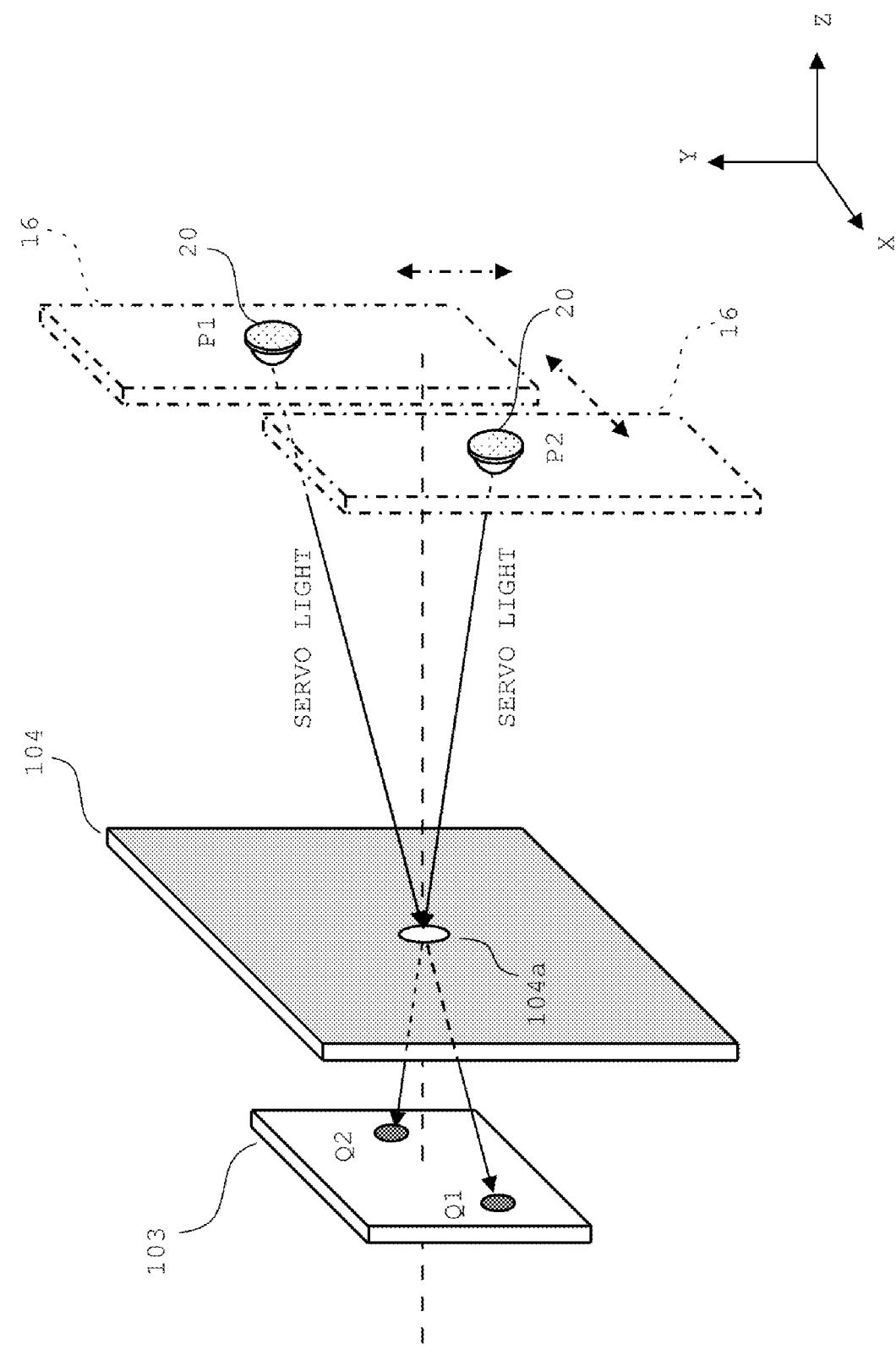
FIG. 5 is a diagram for describing a relation between an emission position of an LED, and an incident position of a PSD in the embodiment.

FIG. 5 is a diagram showing an emission position (a position of the LED 20) of servo light, and an incident position of servo light on the PSD 103.

Referring to FIG. 5, in the case where the LED 20 is located at a position P1, a part of servo light emitted from the LED 20 is transmitted through the hole 104a. The servo light transmitted through the hole 104a is incident at a position Q1 on the light receiving surface of the PSD 103. In this case, the emission position P1 is projected at the incident position Q1 via the hole 104a.

Referring to FIG. 5, in the case where the position of the LED 20 is moved in response to a movement of the scanning lens 14, and the LED 20 is moved to a position P2, a part of servo light emitted from the LED 20 is transmitted through the hole 104a. The servo light transmitted through the hole 104a is incident at a position Q2 on the light receiving surface of the PSD 103. In this case, the emission position P2 is projected at the incident position Q2 via the hole 104a.

As described above, the emission position (the position of the LED 20) of servo light, and the incident position of servo light on the light receiving surface of the PSD 103 have a one-to-one correspondence. Disposing the pinhole plate 104 at a position closer to the PSD 103 with respect to an intermediate position between the LED 20 and the PSD 103 enables to reduce the amplitude of servo light to be incident on the light receiving surface of the PSD 103, as compared with the amplitude of light to be emitted from the LED 20 i.e. a moving width of the scanning lens 14. The pinhole plate 104 may be disposed at a position that enables to properly set the amplitude of servo light with respect to the dimensions of the PSD 103 to be used.

Referring back to FIG. 2, if an obstacle lies in a target area, laser light irradiated in the target area is reflected on the obstacle. Laser light reflected on the obstacle is received by the light receiving lens 15, and condensed on the photodetector 105 through the light receiving lens 15. The photodetector 105 is operable to output a current signal in accordance with a received light amount of reflected laser light.

The driving unit 200 includes a controller 201, a laser driving circuit 202, an actuator driving circuit 203, an LED driving circuit 204, the PSD signal processing circuit 205, an ADC (Analog Digital Converter) 206, a PD signal processing circuit 207, and an ADC (Analog Digital Converter) 208.

The laser driving circuit 202 is operable to drive the semiconductor laser 101 in accordance with a command signal from the controller 201. The actuator driving circuit 203 is operable to drive the lens actuator 10 in accordance with a command signal from the controller 201. The LED driving circuit 204 is operable to drive the LED 20 in accordance with a command signal from the controller 201.

A current signal outputted from the PSD 103 is inputted to the PSD signal processing circuit 205. The computation circuit in the PSD signal processing circuit 205 is operable to perform the aforementioned computations. Thereby, the PSD signal processing circuit 205 is operable to output a position detection signal indicating an incident position of servo light. The position detection signal outputted from the PSD signal processing circuit 205 is inputted to the ADC 206. The ADC 206 is operable to convert the position detection signal from an analog signal to a digital signal. Then, the digital signal is inputted to the controller 201.

A current signal outputted from the photodetector 105 is inputted to the PD signal processing circuit 207. The PD signal processing circuit 207 is operable to amplify the inputted current signal and remove a noise component. The current signal outputted from the PD signal processing circuit 207 is inputted to the ADC 208. The ADC 208 is operable to convert the inputted current signal from an analog signal to a digital signal. Then, the digital signal is inputted to the controller 201, as a reflection light detection signal indicating that reflection light is incident.

The controller 201 is constituted of e.g. a DSP (Digital Signal Processor). The controller 201 is operable to detect a scanning position of laser light in a target area, based on an inputted position detection signal, and control the laser driving circuit 202 and the actuator driving circuit 203 in accordance with a detection result.

In performing a scanning operation, the LED 20 is always allowed to emit laser light at a constant power, and the lens actuator 10 is driven so that laser light is moved for scanning along a predetermined scanning track in a target area. In response to driving of the lens actuator 10, a position (an emission position of servo light) of the LED 20 is changed, and an incident position of servo light on the light receiving surface of the PSD 103 is changed depending on the position of the LED 20. In this embodiment, the scanning position of laser light in the target area, and the position (the emission position of servo light) of the LED 20 have a one-to-one correspondence. Accordingly, the scanning position of laser light in the target area, and the incident position of servo light on the light receiving surface of the PSD 103 also have a one-to-one correspondence.

The controller 201 is operable to detect a scanning position of laser light in a target area, based on a position detection signal from the PSD signal processing circuit 205, and control the semiconductor laser 101 to emit pulse light at a timing when the scanning position coincides with a measuring position (a position for use in detecting an obstacle, and measuring a distance to an obstacle) in the target area. Concurrently, the photodetector 105 is operable to receive light reflected from the target area, detect whether an obstacle lies at the scanning position, based on presence or absence of a reflection light detection signal from the PD signal processing circuit 207, and detect a distance to the obstacle if it is judged that the obstacle lies at the scanning position.

The controller 201 is also operable to detect a scanning position of laser light in the target area, based on a position detection signal from the PSD signal processing circuit 205, and drive the lens actuator 10 for servo control in such a manner that the scanning position follows the predetermined scanning track. In this arrangement, even if external light or the like is incident, an actual measuring position can be made closer to an intended measuring position as much as possible, thereby enabling to increase the precision in detecting an obstacle.

As described above, in this embodiment, the LED 20 of a diffusive type is mounted on the lens frame 16 integrally moved with the scanning lens 14, the pinhole plate 104 is mounted at a position anterior to the PSD 103, and servo light emitted from the LED 20 is incident onto the PSD 103 by way of the pinhole plate 104. This enables to suppress the amplitude of servo light on the light receiving surface of the PSD 103. Thereby, a compact and inexpensive PSD 103 can be used, and an optical system can be miniaturized.

Figure 6A:
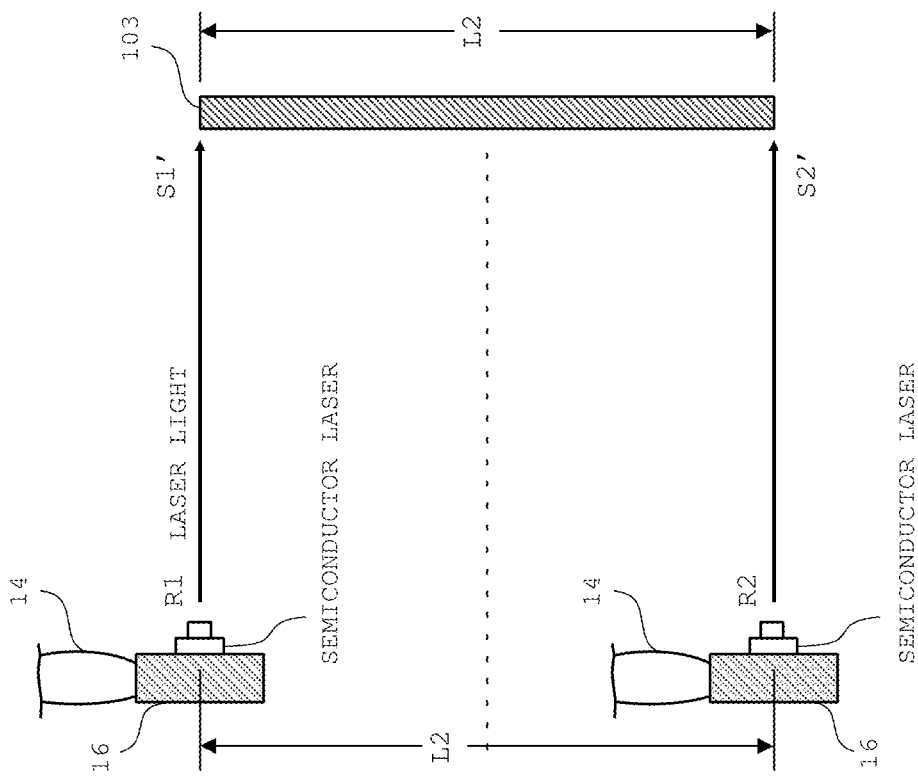
FIGS. 6A and 6B are diagrams for describing an effect of the embodiment.
Figure 6B:
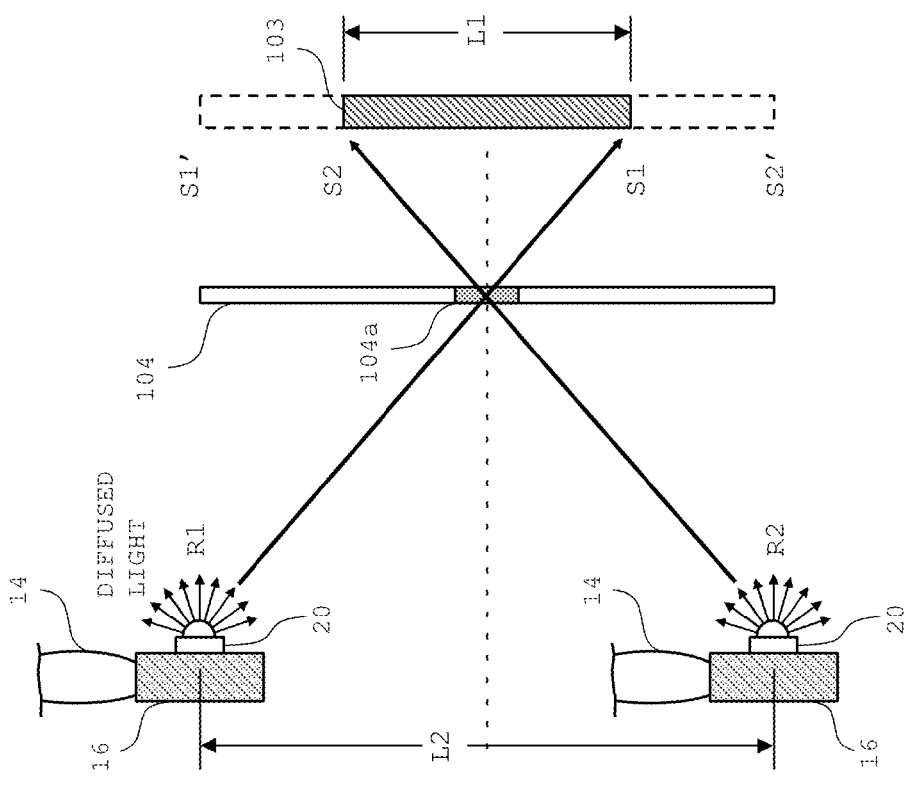

FIGS. 6A and 6B are diagrams schematically showing an effect of the embodiment. FIG. 6A is a diagram showing a relation between an emission position (a position of the LED 20) of servo light, and an incident position of servo light on the PSD 103 in the arrangement of the embodiment. FIG. 6B is a diagram showing a relation between an emission position (a position of a semiconductor laser) of laser light, and an incident position of laser light on the PSD 103, as an arrangement of a comparative example to be compared with the invention.

As shown in FIG. 6B, in the arrangement of the comparative example, a semiconductor laser is mounted on a lens frame 16, in place of the LED 20, and a pinhole plate 104 is not provided. In the arrangement of the comparative example, assuming that the position (the emission position of laser light) of the semiconductor laser is changed from a position R1 to an emission position R2, as a scanning lens 14 is moved, the incident position of laser light on a PSD 103 is changed from a position S1' to a position S2'. In this case, it is necessary to set the dimensions of a light receiving surface of the PSD 103 to such a value as to cover at least an amplitude L2 of laser light, which is substantially equal to a moving width L2 of the semiconductor laser i.e. the scanning lens 14.

On the other hand, as shown in FIG. 6A, in the arrangement of the embodiment, assuming that the position (the emission position of servo light) of the LED 20 (a second light source) is changed from a position R1 to a position R2, as the scanning lens 14 is moved, the positions R1 and R2 are projected at positions S1 and S2 on the PSD 103 (a light receiving position detecting device) through the hole 104a (a predetermined projection area) in the pinhole plate 104. In this arrangement, the amplitude L1 of light incident onto the PSD 103 is significantly reduced, as compared with the amplitude L2 in the comparative example. Thereby, a compact and inexpensive PSD 103 can be used.

The amplitude L1 of incident light is reduced, as the pinhole plate 104 (the hole 104a) is disposed closer to the PSD 103. In view of this, it is desirable to dispose the pinhole plate 104 at a position closer to the PSD 103 to miniaturize the PSD 103. In the case where the dimensions of the PSD 103 is predefined, it is desirable to adjust the position of the pinhole plate 104 so that servo light is allowed to scan a maximally large area on the light receiving surface.

The embodiment of the invention has been described as above, but the invention is not limited to the foregoing embodiment. The embodiment of the invention may be changed or modified in various ways other than the above. In the following, some of the modifications of the embodiment are described.

First Modification

Figure 7:
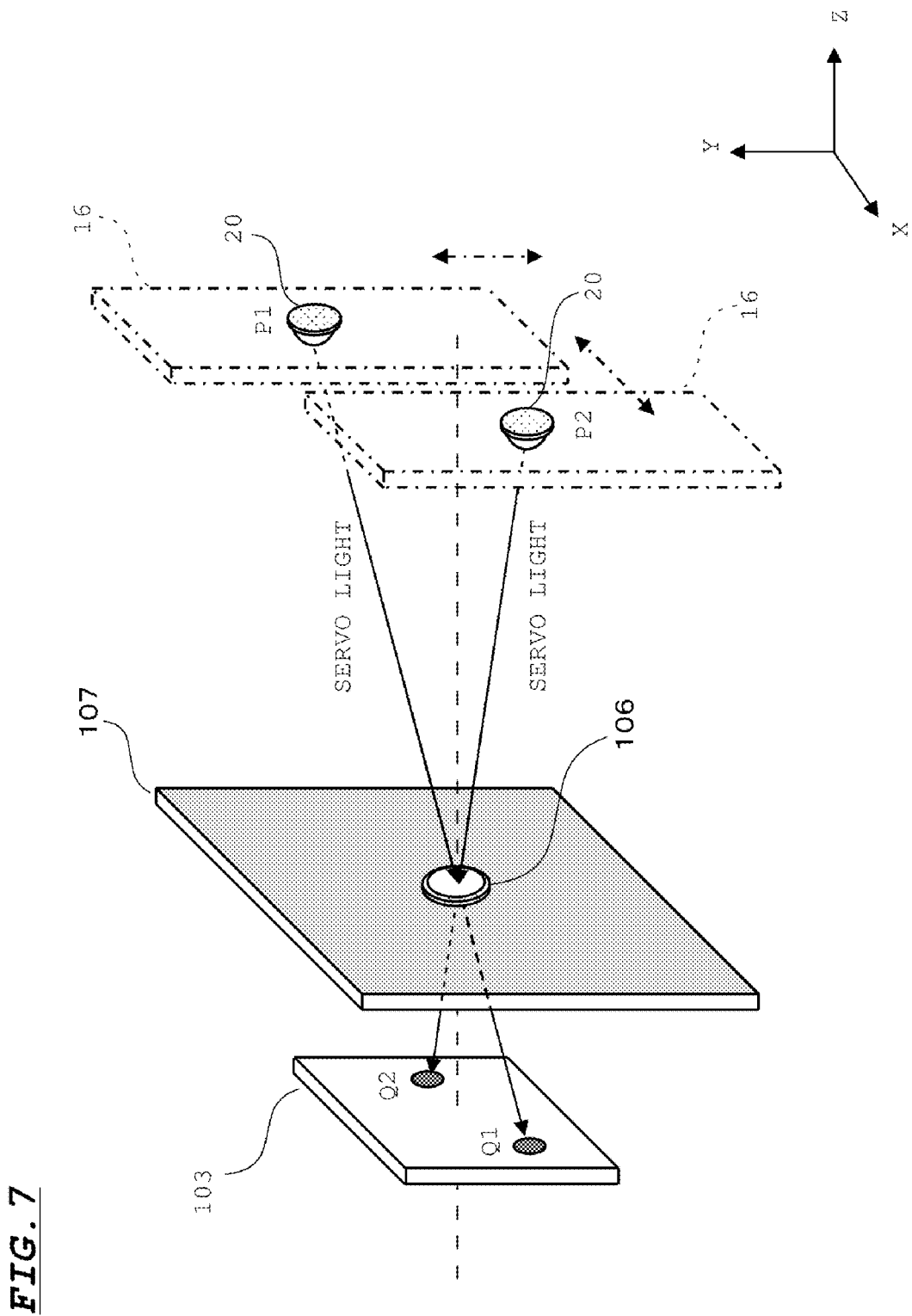
FIG. 7 is a diagram showing an optical system for detecting servo light in a modification (first modification) of the embodiment.

In the embodiment, servo light is incident onto the PSD 103 through the hole 104a of the pinhole plate 104. Alternatively, as shown in FIG. 7, servo light may be allowed to be incident onto a PSD 103 through a condenser lens 106. In the arrangement of FIG. 7, the condenser lens 106 and a supporting member 107 for supporting the condenser lens 106 are provided, in place of the pinhole plate 104 shown in FIG. 2.

Referring to FIG. 7, in the case where an LED 20 is located at a position P1, a part of servo light emitted from the LED 20 is incident onto the condenser lens 106. The servo light incident onto the condenser lens 106 is incident at a position Q1 on a light receiving surface of the PSD 103. In this case, the emission position P1 is projected at the incident position Q1 through the condenser lens 106.

Referring to FIG. 7, in the case where the position of the LED 20 is changed, as a scanning lens 14 is moved, and the LED 20 is moved to a position P2, a part of servo light emitted from the LED 20 is incident onto the condenser lens 106. The servo light incident onto the condenser lens 106 is incident at a position Q2 on the light receiving surface of the PSD 103. In this case, the emission position P2 is projected at the incident position Q2 through the condenser lens 106.

As described above, the emission position of servo light from the LED 20, and the incident position of servo light on the light receiving surface of the PSD 103 have a one-to-one correspondence.

In this way, providing the condenser lens 106 in place of the pinhole plate 104 enables to converge a part of diffused light on the PSD 103, thereby enabling to precisely detect an incident position of servo light on the PSD 103. In the modification, a compact condenser lens 106 can be used. This is advantageous in reducing the cost of a lens actuator and miniaturizing an optical system.

Further alternatively, constituting the supporting member 107 of a light blocking plate, and mounting the condenser lens 106 in a hole formed in the center of the light blocking plate is advantageous in suppressing unwanted servo light which is incident in a region other than the condenser lens 106 from being incident onto the light receiving surface of the PSD 103. The modification is advantageous in eliminating a likelihood that noise by unwanted servo light may be superimposed on an output signal from the PSD 103.

In the arrangement of FIG. 7, servo light is converged by the condenser lens 106. Accordingly, even if unwanted servo light is incident onto the light receiving surface of the PSD 103, the intensity of servo light at the convergent position is several times as high as the intensity of light incident in a region other than the light receiving surface of the PSD 103. Generally, this enables to sufficiently detect a convergent position of servo light based on a signal from the PSD 103, even if the supporting member 107 does not have a light blocking function, and unwanted servo light is incident onto the light receiving surface of the PSD 103.

Second Modification

Figure 8:
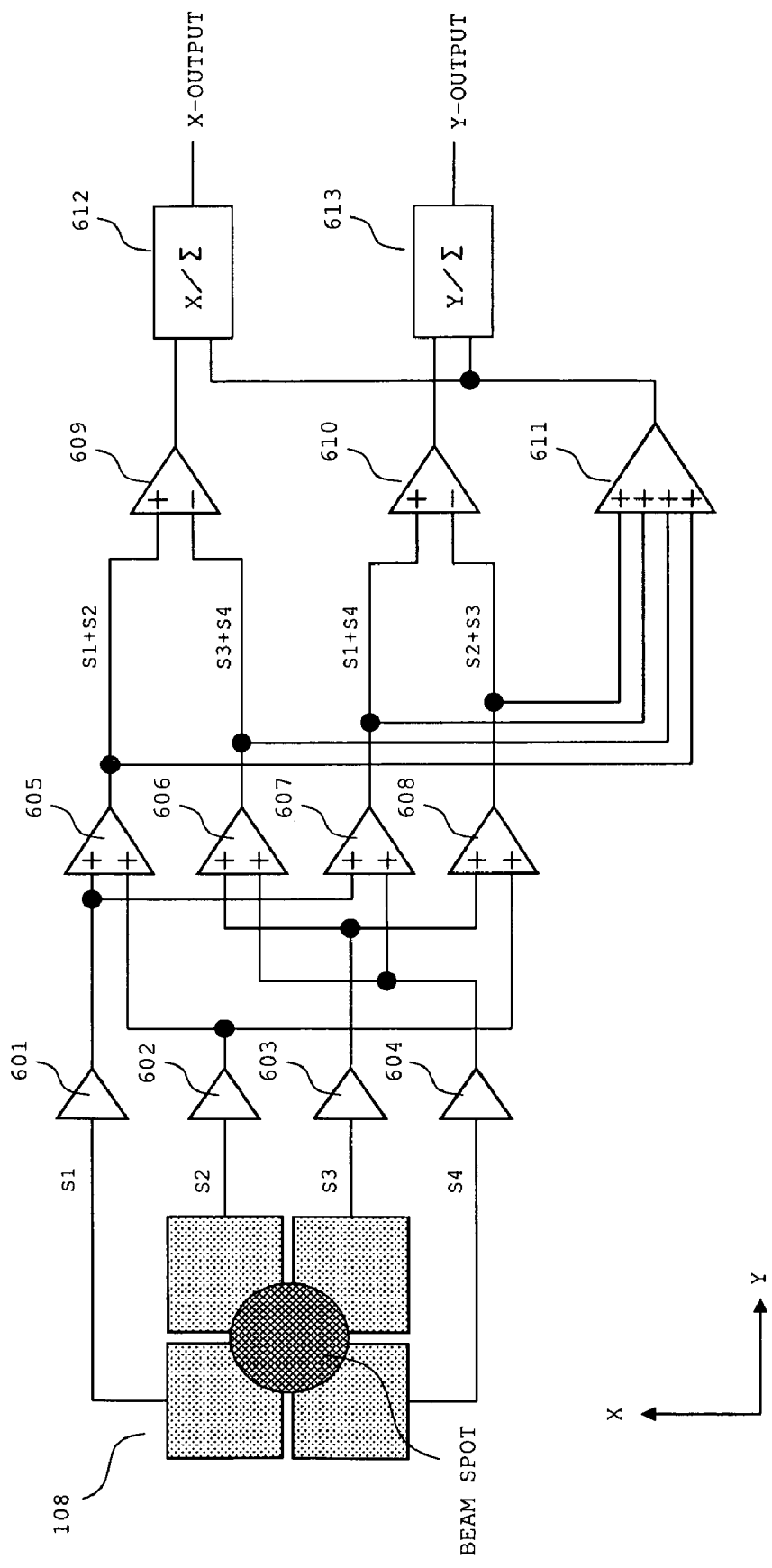
FIG. 8 is a diagram showing a sensor pattern and a circuit arrangement for detecting servo light in a modification (second modification) of the embodiment.

In the embodiment, the PSD 103 is used as a light receiving position detecting device for receiving servo light. Alternatively, as shown in FIG. 8, a four-divided sensor 108 may be used as the light receiving position detecting device. In this modification, in the case where a scanning lens 14 is located at a neutral position, servo light is irradiated at a center position of the four-divided sensor 108. In this modification, the term "neutral position" indicates a position where an optical axis of the scanning lens 14 is aligned with an optical axis of laser light to be emitted from a semiconductor laser 101.

An X-direction position and a Y-direction position of a beam spot are calculated by e.g. the following equations (3) and (4):

$$\frac{(S1+S2)-(S3+S4)}{S1+S2+S3+S4}=x \tag{3}$$

$$\frac{(S1+S4)-(S2+S3)}{S1+S2+S3+S4}=y \tag{4}$$

where S1, S2, S3, and S4 are output signals from sensing portions of the four-divided sensor 108, as shown in FIG. 8.

An arrangement of a computation circuit for realizing the above equations (3) and (4) is also shown in FIG. 8. In the modification, a signal processing circuit provided with the computation circuit is used, in place of the PSD signal processing circuit 205. The signals S1, S2, S3, and S4 to be outputted from the sensing portions of the four-divided sensor 108 are amplified by amplifiers 601, 602, 603, and 604, respectively. Then, adding circuits 605, 606, 607, and 608 perform computations (S1+S2), (S3+S4), (S1+S4), and (S2+S3), respectively. Then, subtracting circuits 609 and 610 perform computations (S1+S2)−(S3+S4) and (S1+S4)−(S2+S3), respectively.

Then, an adding circuit 611 performs a computation (S1+S2+S3+S4). Then, dividing circuits 612 and 613 perform divisions represented by the left sides in the equations (3) and (4), respectively. Then, the dividing circuits 612 and 613 output position detection signals (X-output and Y-output) indicating a light receiving position of servo light in x-direction and y-direction, respectively. Since the total light amount is not changed, a difference may be calculated by performing computations: (S1+S2)−(S3+S4)=X, and (S1+S4)−(S2+S3)=Y.

Third Modification

In the embodiment, the scanning lens 14 is provided as a scanning section in the lens actuator 10, and the scanning lens 14 is moved to scan a target area with laser light. Alternatively, as shown in FIG. 9, a concave mirror 21 may be provided as the scanning section in a lens actuator 10.

Figure 9:
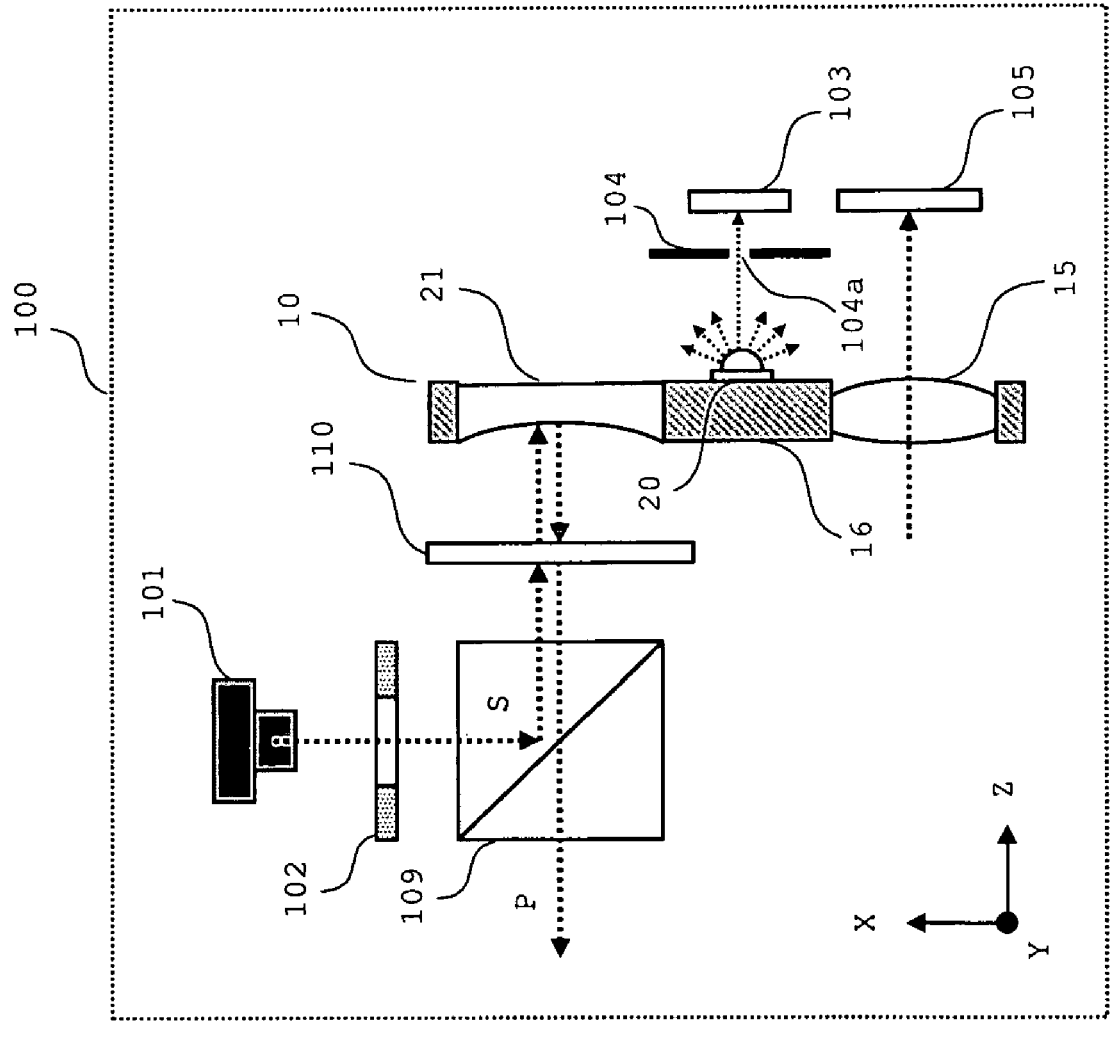
FIG. 9 is a diagram showing an arrangement of a beam irradiation device in a modification (third modification) of the embodiment.

In the arrangement of FIG. 9, a polarized beam splitter (PBS) 109 and a quarter wavelength plate 110 are provided in a front region of the concave mirror 21. A semiconductor laser 101 and an aperture plate 102 are provided so that laser light is incident onto the PBS 109 in a direction orthogonal to a reflection surface of the concave mirror 21. The semiconductor laser 101 is arranged at such a position that a polarization direction of laser light to be emitted from the semiconductor laser 101 is aligned with a direction of S-polarized light with respect to the PBS 109. The other arrangement in the modification is substantially the same as the corresponding arrangement in the embodiment.

Laser light emitted from the semiconductor laser 101 has its shape formed into an intended shape through an aperture in the aperture plate 102. Thereafter, the laser light is incident onto the PBS 109. Since the laser light is S-polarized light, the laser light is reflected on the PBS 109, and incident onto the concave mirror 21 through the quarter wavelength plate 110.

The laser light through the quarter wavelength plate 110 is converted from the S-polarized light into circularly polarized light.

The laser light incident onto the concave mirror 21 is reflected on the concave mirror 21, and incident onto the PBS 109 through the quarter wavelength plate 110. The laser light through the quarter wavelength plate 110 is converted from the circularly polarized light into P-polarized light. Since the laser light incident onto the PBS 109 is P-polarized light, the laser light is transmitted through the PBS 109. Thus, the laser light emitted outside is irradiated in a target area.

Fourth Modification

A mirror actuator 700 provided with a mirror 713 for scanning a target area with laser light may be used, as shown in FIGS. 10A, 10B, 11, and 12A, in place of a scanning mechanism described in the embodiment.

Figure 10:
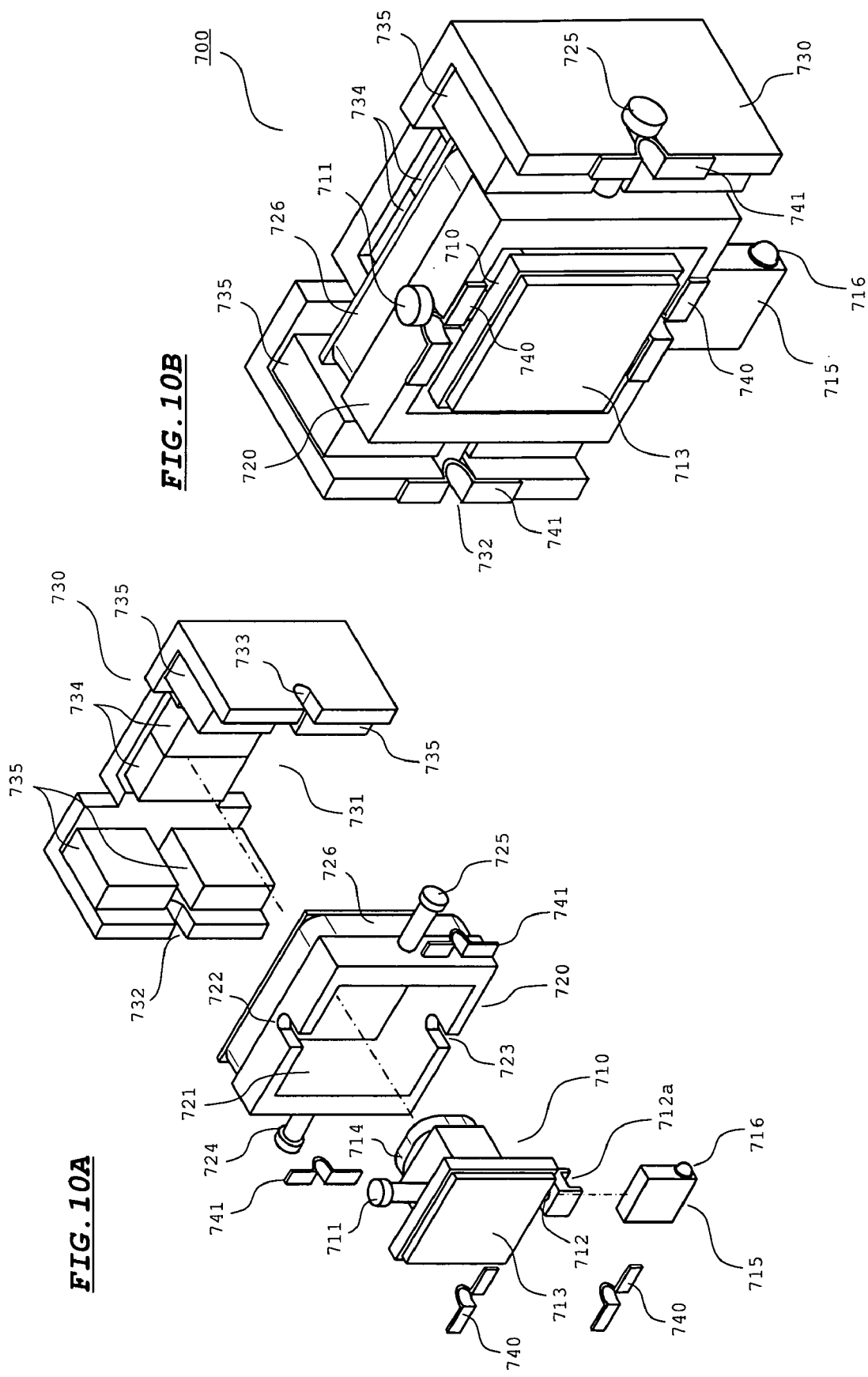
FIGS. 10A and 10B are diagrams showing an arrangement of a mirror actuator in a modification (fourth modification) of the embodiment.

FIGS. 10A and 10B are diagrams showing an arrangement of the mirror actuator 700. FIG. 10A is an exploded perspective view of the mirror actuator 700, and FIG. 10B is a perspective view of the mirror actuator 700 in an assembled state.

Referring to FIG. 10A, the reference numeral 710 indicates a mirror holder. The mirror holder 710 has a support shaft 711 formed with an engaging portion at an end thereof, and a support shaft 712 formed with a receiving portion 712a at an end thereof. The receiving portion 712a has a recessed portion with a dimension substantially the same as the thickness of a pivotal plate 715. An upper portion of the pivotal plate 715 is mounted in the recessed portion. A flat-plate like mirror 713 is mounted on a front surface of the mirror holder 710, and a coil 714 is mounted on a rear surface thereof. The coil 714 is wound into a rectangular shape.

As described above, the parallel-plate-like pivotal plate is mounted on the support shaft 712 by way of the receiving portion 712a. An LED 716 is mounted on a side portion of the pivotal plate 715. The LED 716 is of a diffusive type (a wide-angle type) and is capable of diffusing light at a wide angle. The reference numeral 720 indicates a movable frame for pivotally supporting the mirror holder 710 about axes of the support shafts 711 and 712. The movable frame 720 has an opening for housing the mirror holder 710. The movable frame 720 also has grooves 722 and 723 to be engageable with the support shafts and 712 of the mirror holder 710, respectively. Support shafts 724 and 725 each having an engaging portion at an end thereof are formed on side surfaces of the movable frame 720, respectively, and a coil 726 is mounted on a rear surface of the movable frame 720. The coil 726 is wound into a rectangular shape.

The reference numeral 730 indicates a fixed frame for pivotally supporting the movable frame 720 about axes of the support shafts 724 and 725. The fixed frame 730 has a recessed portion 731 for housing the movable frame 720. The fixed frame 730 also has grooves 732 and 733 to be engaged with the support shafts 724 and 725 of the movable frame 720, respectively. Magnets 734 for applying a magnetic field to the coil 714, and magnets 735 for applying a magnetic field to the coil 726 are mounted on inner surfaces of the fixed frame 730, respectively. The grooves 732 and 733 each extends from a front surface of the fixed frame 730 to a clearance between the corresponding upper and lower two magnets 735.

The reference numeral 740 indicates pressing plates for pressing the support shafts 711 and 712 rearwardly to prevent the support shafts 711 and 712 of the mirror holder 710 from being disengaged from the grooves 722 and 723 of the movable frame 720, respectively. The reference numeral 741 indicates pressing plates for pressing the support shafts 724 and 725 rearwardly to prevent the support shafts 724 and 725 of the movable frame 720 from being disengaged from the grooves 732 and 733 of the fixed frame 730, respectively.

In assembling the parts into the mirror actuator 700, the support shafts 711 and 712 of the mirror holder 710 are engaged in the grooves 722 and 723 of the movable frame 720, and then, the pressing plates 740 are mounted on front surfaces of the movable frame 720, while being pressed against front portions of the support shafts 711 and 712. Thereby, the mirror holder 710 is pivotally supported on the movable frame 720.

After the mirror holder 710 is mounted on the movable frame 720 as described above, the support shafts 724 and 725 of the movable frame 720 are engaged in the grooves 732 and 733 of the fixed frame 730, and then, the pressing plates 741 are mounted on the front surfaces of the fixed frame 730, while being pressed against front portions of the support shafts 732 and 733. Thereby, the movable frame 720 is pivotally mounted on the fixed frame 730. Thus, the assembling operation of the mirror actuator 700 is completed.

As the mirror holder 710 is pivotally moved with respect to the movable frame 720 about the axes of the support shafts 711 and 712, the mirror 713 is also pivotally moved. Likewise, as the movable frame 720 is pivotally moved with respect to the fixed frame 730 about the axes of the support shafts 724 and 725, the mirror holder 710 is also pivotally moved, and the mirror 713 is pivotally moved with the mirror holder 710. In this way, the mirror holder 710 is pivotally moved in two-dimensional directions, while being supported by the support shafts 711 and 712, and the support shafts 724 and 725 perpendicularly intersecting with each other; and the mirror 713 is pivotally moved in two-dimensional directions, as the mirror holder 710 is pivotally moved. When the mirror 713 is pivotally moved, the pivotal plate 715 mounted on the support shaft 712 is also pivotally moved. As a result, the LED 716 mounted on the side portion of the pivotal plate 715 is pivotally moved, as the mirror 713 is pivotally moved.

In the assembled state shown in FIG. 10B, the two magnets 734 are arranged at predetermined positions, and polarities thereof are adjusted in such a manner that a force for pivotally moving the mirror holder 710 about the axes of the support shafts 711 and 712 is generated by applying a current to the coil 714. In this arrangement, in response to application of a current to the coil 714, the mirror holder 710 is pivotally moved about the axes of the support shafts 711 and 712 by an electromagnetic driving force generated on the coil 714.

Similarly to the above, in the assembled state shown in FIG. 10B, the two magnets 735 are arranged at predetermined positions, and polarities thereof are adjusted in such a manner that a force for pivotally moving the movable frame 720 about the axes of the support shafts 724 and 725 is generated by applying a current to the coil 726. In this arrangement, in response to application of a current to the coil 726, the movable frame 720 is pivotally moved about the axes of the support shafts 724 and 725 by an electromagnetic driving force generated on the coil 726. Thereby, the pivotal plate 715 is pivotally moved.

A driving signal is supplied to the coils 714 and 726, and the LED 716 via an unillustrated lead wire.

Figure 11:
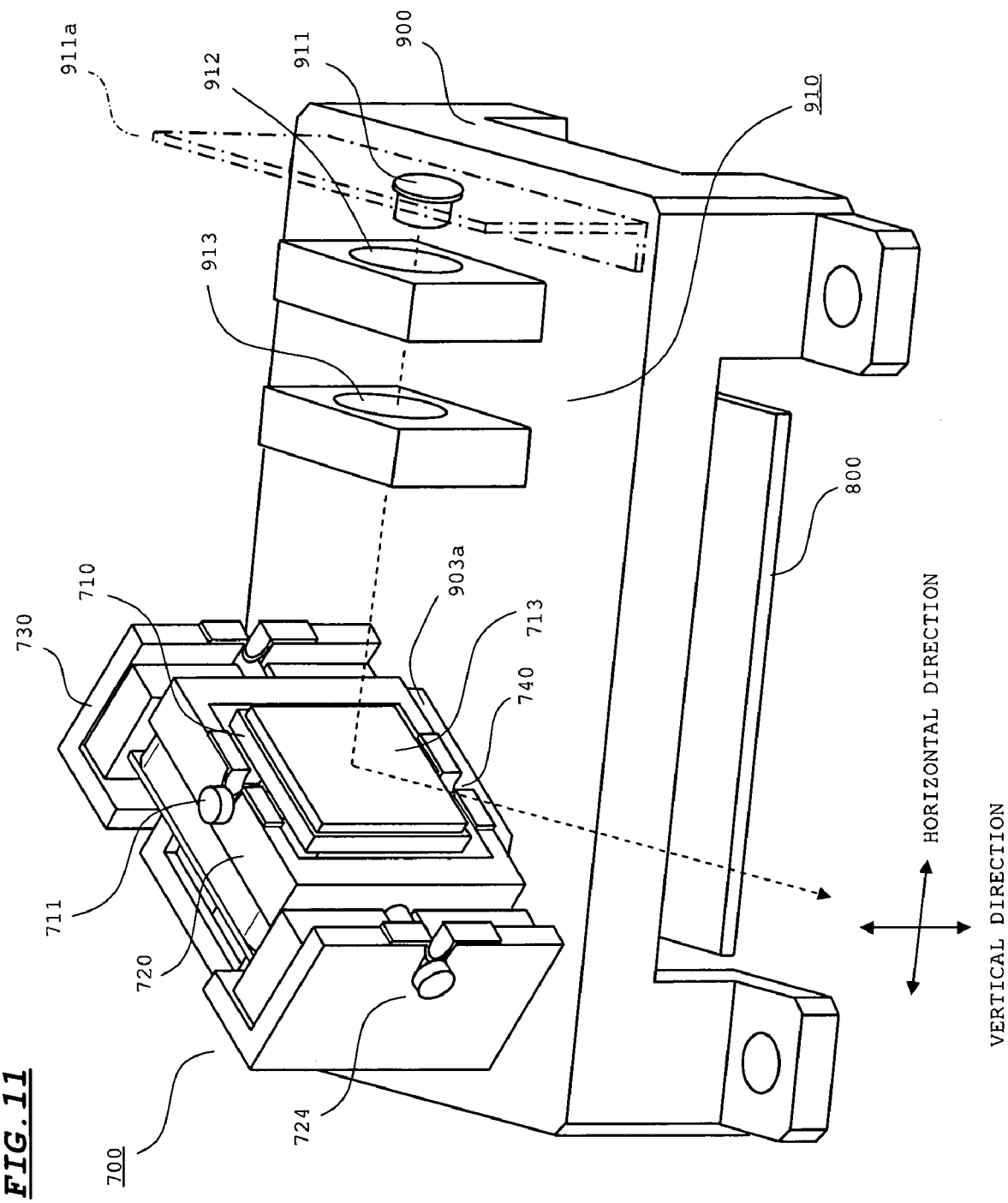
FIG. 11 is a diagram showing an arrangement of a beam irradiation device in the modification (fourth modification) of the embodiment.

FIG. 11 is a diagram showing an arrangement of an optical system, wherein the mirror actuator 700 is mounted.

Referring to FIG. 11, the reference numeral 900 indicates a base member for supporting an optical system. The base member 900 has an opening 903a at a position where the mirror actuator 700 is mounted. The mirror actuator 700 is mounted on the base member 900 in a state that the pivotal plate 715 is mounted in the opening 903a.

An optical system 910 for guiding laser light to the mirror 713 is mounted on an upper surface of the base member 900. The optical system 910 is constituted of a laser light source 911, and beam shaping lenses 912 and 913. The laser light source 911 is mounted on a substrate 911a for the laser light source, which is mounted on the upper surface of the base member 900.

Laser light emitted from the laser light source 911 is subjected to convergence in a horizontal direction and a vertical direction through the lenses 912 and 913, respectively. The lens 912, 913 is designed in such a manner that a light beam in a target area (e.g. defined at a position about 100 meters ahead of a beam exit port of a beam irradiation device) has predetermined dimensions (e.g. about 2 meters in a vertical direction and about 1 meter in a horizontal direction).

The lens 912 is a cylindrical lens having a lens function in a vertical direction. The lens 913 is an aspherical lens for converting laser light into substantially parallel light. A light beam emitted from a laser light source has divergent angles different from each other in a vertical direction and a horizontal direction. The first lens 912 is operable to change a ratio of divergent angles of laser light in a vertical direction and a horizontal direction. The second lens 913 is operable to change a magnification ratio of a divergent angle of an emitted beam (both in a vertical direction and a horizontal direction).

Laser light transmitted through the lenses 912 and 913 is incident onto the mirror 713 mounted on the mirror actuator 700, and reflected toward a target area by the mirror 713. As the mirror 713 is driven about two axes by the mirror actuator 700, a target area is scanned in two-dimensional directions with laser light.

The mirror actuator 700 is disposed at such a position that laser light through the lens 913 is incident onto a mirror surface of the mirror 713 at an angle of 45 degrees with respect to a horizontal direction, in the case where the mirror 713 is located at a neutral position. In this modification, the term "neutral position" indicates a position of the mirror 713, wherein the mirror surface is aligned in parallel to a vertical direction, and laser light is incident onto the mirror surface at an angle of 45 degrees with respect to a horizontal direction.

A circuit substrate 800 is mounted below the base member 900. A circuit substrate 801 (not shown in FIG. 11) is mounted on a rear surface of the base member 900.

FIG. 12A is a partially plan view of the base member 900, viewed from the rear surface of the base member 900. FIG. 12A shows a part of the rear surface of the base member 900 in the vicinity of a position where the mirror actuator 700 is mounted.

As shown in FIG. 12A, walls 901 and 902 are formed on a periphery of the rear surface of the base member 900. An intermediate portion on the rear surface of the base member 900 other than the walls 901 and 902 is formed into a flat plane 903 having a height lower than the height of the walls 901 and 902. The opening 903a is formed in the flat plane 903 on the rear surface of the base member 900. The pivotal plate 715 mounted on the mirror actuator 700 protrudes from the rear surface of the base member 900 through the opening 903a.

The circuit substrate 801 carrying a PSD 802 is mounted on the rear surface of the base member 900 near the wall 901. A pinhole plate 803 is attached to the rear surface of the base member 900, at a position between the opening 903a and the PSD 802. The pinhole plate 803 has a hole 803a in the center thereof.

The LED 716, the PSD 802, and the pinhole plate 803 are disposed at such positions that the LED 716 faces the hole 803a of the pinhole plate 803 and a center of the PSD 802, in the case where the mirror 713 mounted on the mirror actuator 700 is located at the neutral position. Specifically, in the case where the mirror 713 is located at the neutral position, the pinhole plate 803 and the PSD 802 are arranged at such positions that a center beam of a light flux passing the LED 716 and the hole 803a of the pinhole plate 803 is incident at a center of the PSD 802 in a direction perpendicular to a light receiving surface of the PSD 802. The pinhole plate 803 is also arranged at a position from an intermediate position between the LED 716 and the PSD 802 to the PSD 802, in the case where the mirror 713 is located at the neutral position.

A part of servo light diffusively emitted from the LED 716 is transmitted through the hole 803a of the pinhole plate 803, and received on the PSD 802. Servo light which is incident in a region other than the hole 803a is blocked by the pinhole plate 803. The PSD 802 is operable to output a current signal in accordance with a receiving position of servo light.

For instance, in response to a pivotal movement of the mirror 713 from the neutral position in a horizontal direction, the pivotal plate 715 is pivotally moved, as shown in FIG. 12B. Thereby, an optical path of light passing through the hole 803a of the pinhole plate 803, out of diffused light from the LED 716, is changed from an optical path LP1 to an optical path LP2. As a result, the irradiated position of servo light on the PSD 802 is changed, and a position detection signal to be outputted from the PSD 802 is changed. In this case, the emission position of servo light from the LED 716, and the incident position of servo light on the light receiving surface of the PSD 802 have a one-to-one correspondence.

As described above, similarly to the embodiment, the arrangement shown in FIGS. 10A, 10B, 11, and 12A enables to reduce the amplitude of servo light on the light receiving surface of the PSD 802, as compared with the amplitude of laser light to be emitted from the laser light source 911. Thereby, a compact and inexpensive PSD 802 can be used, and an optical system can be miniaturized.

In the arrangement shown in FIGS. 10A, 10B, 11, and 12A, the LED 716 is disposed on the side portion of the pivotal plate 715 mounted on the support shaft 712. Alternatively, the LED 716 may be disposed at a position on the mirror actuator 700 other than the above. The LED 716 may be disposed at any position, as far as the LED 716 is pivotally moved, as the mirror 713 is pivotally moved about the axes of the support shafts 711 and 712, and the axes of the support shafts 724 and 725, and the pinhole plate 803 and the PSD 802 can be mounted.

Other Modifications

In the embodiment, the LED 20 of a diffusive type (a wide-angle type) is used as a second light source for diffusively emitting servo light. Alternatively, the second light source may be constituted of an LED of a non-diffusing type, and a light diffusing lens disposed on a light exit side of the LED and having a light diffusing function. Further alternatively, the second light source may be constituted of an LED of a non-diffusing type, and a light diffusing cap for covering the LED and having a light diffusing function.

The embodiment is directed to an arrangement for detecting a movement of a scanning lens. An aspect of the invention is not limited to the arrangement for detecting a movement of a scanning lens, but may be directed to a detecting device for detecting a position of a movable object. In the modification, the LED 20 in the embodiment may be mounted on e.g. a movable object whose position is to be detected. The modification is also advantageous in miniaturizing the PSD 103, and reducing the cost of the detecting device, in the similar manner as described above.

The embodiment of the invention may be changed or modified in various ways according to needs, as far as such changes and modifications do not depart from the scope of the present invention hereinafter defined.

What is claimed is:

1. A beam irradiation device comprising:
   a first light source for emitting laser light;
   an actuator for moving a scanning section for receiving the laser light to scan a target area with the laser light;
   a second light source movable with the scanning section and adapted for emitting diffused light;
   a light receiving position detecting device for receiving the diffused light to output a signal depending on a position of receiving the diffused light; and
   a light projecting element, disposed at a position closer to the light receiving position detecting device with respect to an intermediate position between the second light source and the light receiving position detecting device, for projecting an emission position to be defined by the second light source on the light receiving position detecting device via a predetermined projection area.

2. The beam irradiation device according to claim 1, wherein
   the light projecting element is a pinhole plate having a hole through which a part of the diffused light is transmitted.

3. The beam irradiation device according to claim 1, wherein
   the light projecting element is a lens element for condensing a part of the diffused light on the light receiving position detecting device.

4. The beam irradiation device according to claim 1, wherein
   the actuator includes a conductive suspension wire for movably supporting the scanning section and the second light source, and
   an electric power is supplied to the second light source via the suspension wire.

5. A laser radar system comprising:
   a beam irradiation device for irradiating laser light onto a target area;
   a photodetector for receiving light reflected from the target area; and
   a circuit section for detecting a state of the target area based on an output signal from the photodetector, wherein
   the beam irradiation device includes:
      a first laser light for emitting laser light;
      an actuator for moving a scanning section for receiving the laser light to scan the target area with the laser light;
      a second light source movable with the scanning section and adapted for emitting diffused light;
      a light receiving position detecting device for receiving the diffused light to output a signal depending on a position of receiving the diffused light; and
      a light projecting element, disposed at a position closer to the light receiving position detecting device with respect to an intermediate position between the second light source and the light receiving position detecting device, for projecting an emission position to be defined by the second light source on the light receiving position detecting device via a predetermined projection area.

6. The laser radar system according to claim 5, wherein
   the light projecting element is a pinhole plate having a hole through which a part of the diffused light is transmitted.

7. The laser radar system according to claim 5, wherein
   the light projecting element is a lens element for condensing a part of the diffused light on the light receiving position detecting device.

8. The laser radar system according to claim 5, wherein
   the actuator includes a conductive suspension wire for movably supporting the scanning section and the second light source, and
   an electric power is supplied to the second light source via the suspension wire.

9. A detecting device for detecting a position of a movable object, comprising:
   a light source movable with the movable object, and adapted for emitting diffused light;
   a light receiving position detecting device for receiving the diffused light to output a signal depending on a position of receiving the diffused light; and
   a light projecting element, disposed at a position closer to the light receiving position detecting device with respect to an intermediate position between the light source and the light receiving position detecting device, for projecting an emission position to be defined by the light source on the light receiving position detecting device via a predetermined projection area.

10. The detecting device according to claim 9, wherein
    the light projecting element is a pinhole plate having a hole through which a part of the diffused light is transmitted.

11. The detecting device according to claim 9, wherein
    the light projecting element is a lens element for condensing a part of the diffused light on the light receiving position detecting device.

* * * * *